Dec. 30, 1941.   R. S. SANFORD ET AL   2,268,086
FLUID PRESSURE MECHANISM
Filed Oct. 17, 1939   2 Sheets-Sheet 1
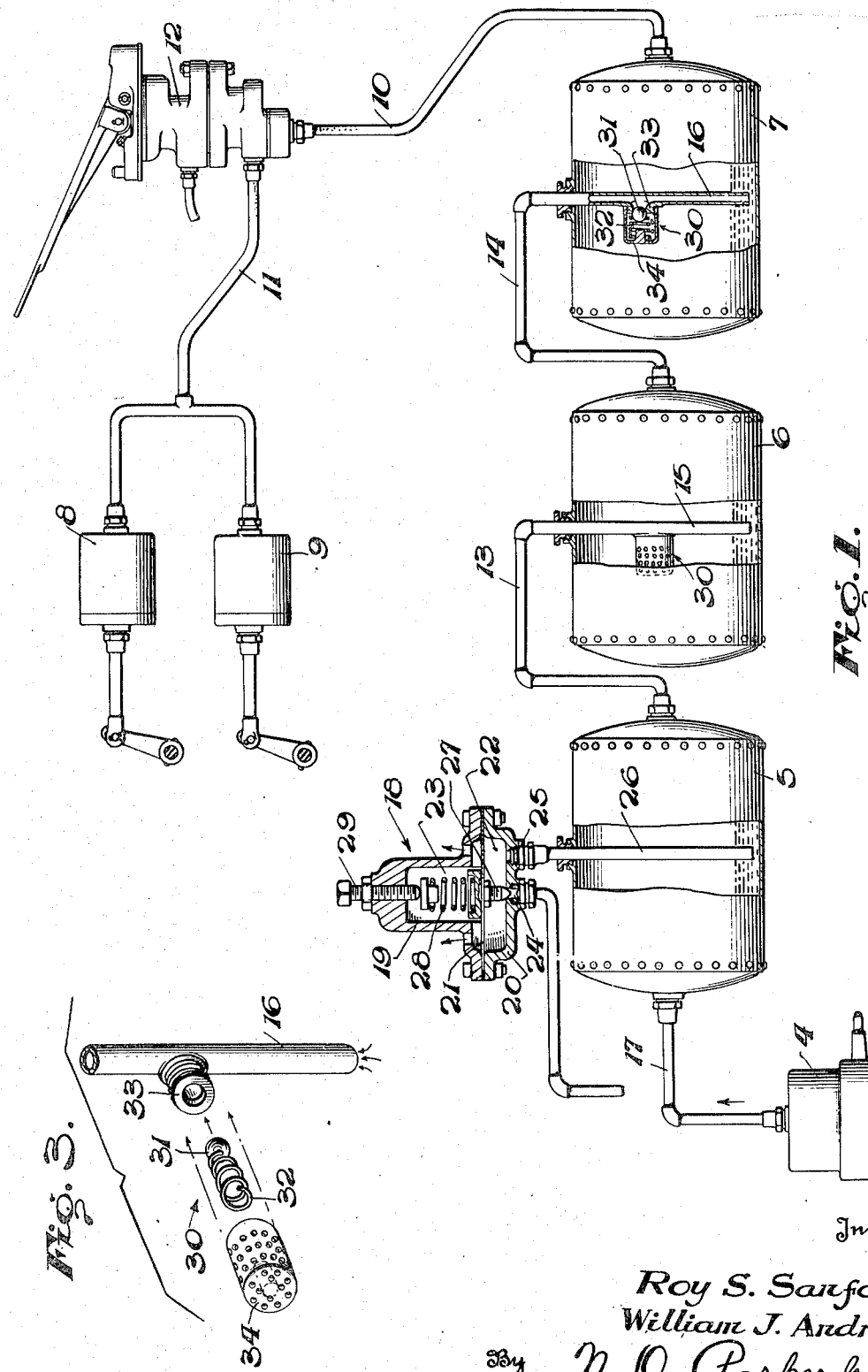
Inventors
Roy S. Sanford
William J. Andres.
By N. D. Parker Jr.
Attorney Dec. 30, 1941.  R. S. SANFORD ET AL  2,268,086
FLUID PRESSURE MECHANISM
Filed Oct. 17, 1939  2 Sheets-Sheet 2
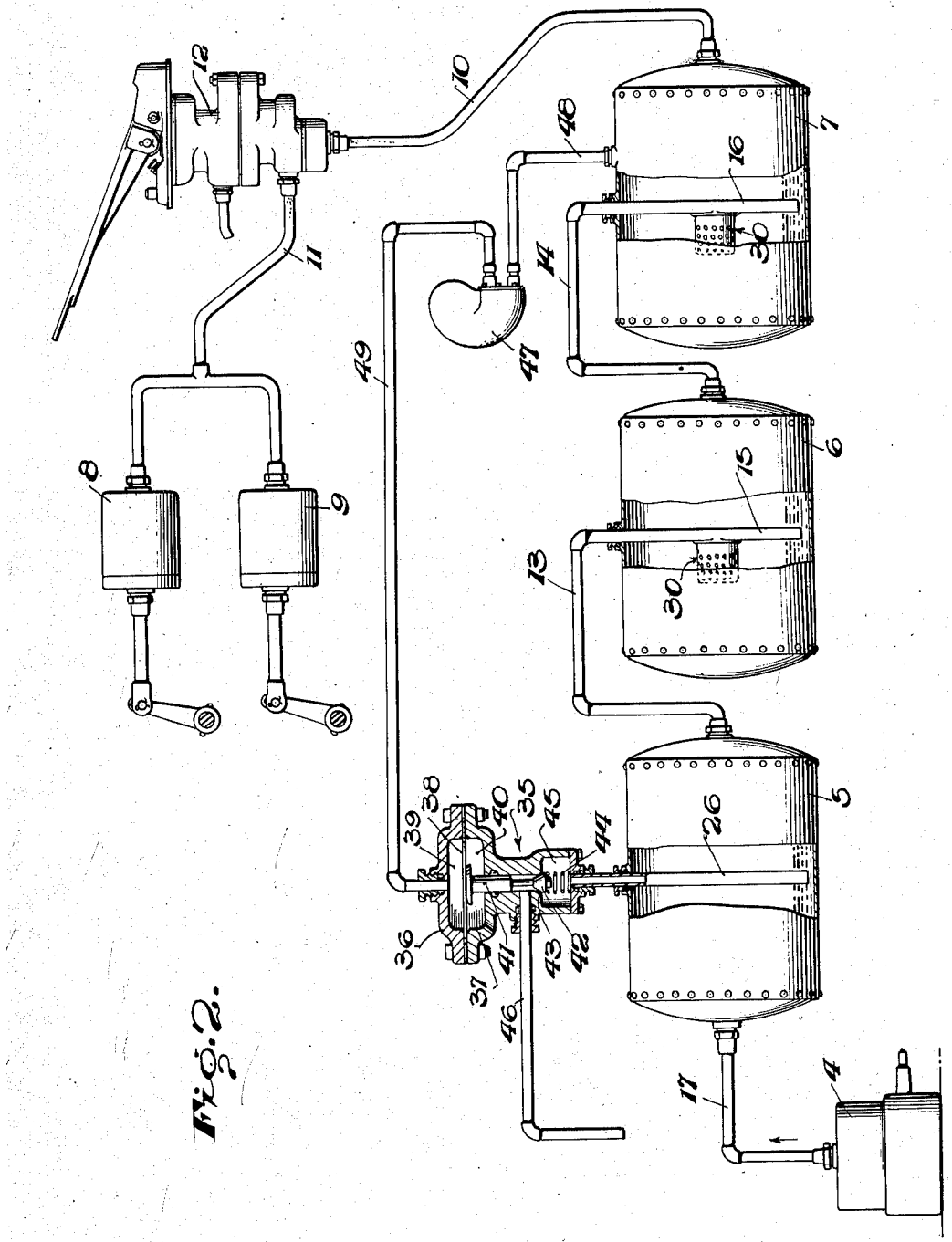
Inventors
Roy S. Sanford
William J. Andres.
By N. D. Parker Jr.
Attorney Patented Dec. 30, 1941

2,268,086

UNITED STATES PATENT OFFICE 2,268,086

FLUID PRESSURE MECHANISM

Roy S. Sanford and William J. Andres, Pittsburgh, Pa., assignors to Bendix-Westinghouse Automotive Air Brake Company, Pittsburgh, Pa., a corporation of Delaware Application October 17, 1939, Serial No. 299,904

17 Claims. (Cl. 303—88)

This invention relates to fluid pressure systems and more particularly to a mechanism for automatically exhausting liquid condensate from a compressed air system.

In the use of compressed air systems heretofore, it has been found that, during operation of the system, a certain amount of liquid condensate is separated from the pressure fluid and usually finds its way to the lowest point in the system. In mild weather, the existence of such condensate offers no serious difficulties. However, in severe cold weather, such condensate is apt to freeze and thereby obstruct the proper flow of pressure fluid to effect the desired functions of the system. It has, moreover, been observed that, in fluid pressure systems for operating various motor vehicle control devices, such as brakes, clutches, etc., a certain amount of the entrained liquid may be carried through the system where it may freeze and prevent movement of essential control elements. Various devices have been resorted to heretofore in an attempt to either prevent freezing of such condensate or to periodically drain the same from the system. However, these prior arrangements have possessed certain disadvantages among which may be mentioned the necessity of using auxiliary devices such as heaters, or the necessity of manual operations in effecting the draining of the liquid.

One of the objects of the present invention is to provide a fluid pressure system constituted in such a manner as to avoid the above mentioned difficulties.

A further object is to provide a fluid pressure system arranged so as to automatically and periodically eliminate the condensate without any thought or attention on the part of the operator.

A still further object is to provide, in a system of the above character, a novel arrangement wherein the separation of substantially all entrained liquid is assured, thus decreasing the tendency of such liquid being carried over into the operative parts of the system.

A further object is to provide a novel arrangement of the above type which will be relatively inexpensive, will require the addition of a few parts only to existing systems and which will require no attention on the part of the operator.

Other objects and novel features of the invention will appear more fully hereinafter from a consideration of the following detailed description when taken in connection with the accompanying drawings illustrating two embodiments of the invention. It is to be expressly understood, however, that the drawings are utilized for purposes of illustration only and are not designed as a definition of the limits of the invention, reference being had for this latter purpose to the appended claims.

In the drawings, wherein similar reference characters refer to like parts throughout the several views:

Fig. 1 is a diagrammatic view, partly in section, showing a fluid pressure system illustrative of one form of the present invention;

Fig. 2 is a diagrammatic view, partly in section, illustrating another form of the invention, and Fig. 3 is a partial view in perspective of a safety valve device employed in connection with Figs. 1 and 2.

Referring more particularly to the construction illustrated in Fig. 1, an arrangement embodying the principles of the present invention is disclosed therein as including a compressor 4, which may be driven by the internal combustion engine of an automotive vehicle, not shown, such compressor supplying fluid under pressure to a plurality of reservoirs 5, 6 and 7 connected in series. The output of the reservoirs may be utilized for controlling any fluid pressure-operated apparatus on the vehicle, such as brake cylinders 8 and 9, fluid pressure from reservoir 7 being conducted to such cylinders by way of conduits 10 and 11 having a suitable control valve 12 interposed therein.

In order to interconnect the reservoirs 5, 6 and 7 so that fluid pressure will be conducted therethrough in series, and for the additional purpose of enabling condensed liquid in these reservoirs to be accumulated in one reservoir and subsequently drained therefrom, reservoirs 6 and 7 are interconnected in series relationship with reservoir 5 by conduits 13 and 14. As shown, each of these conduits includes respective sections 15 and 16 which terminate closely adjacent the bottoms of reservoirs 6 and 7, so that they will be immersed in any liquid condensate which may be separated from the pressure fluid within these reservoirs. A suitable conduit connection 17 connecting compressor 4 and reservoir 5 completes the series arrangement constituting the fluid pressure system of the present invention.

Means are associated with reservoir 5 for relieving the liquid condensate accumulated in said reservoir, and, as shown, such means include a valve device 18 of the pressure-responsive type. More particularly, the valve device 18 includes a casing having upper and lower sections 19 and 20, between which a pressure-responsive diaphragm 21 is secured. This diaphragm separates the casing into chambers 22 and 23, the first named chamber being provided with an atmospheric connection 24 and an inlet connection 25. A conduit 26 having its lower end positioned closely adjacent the bottom of reservoir 5 is connected to the inlet 25 in order to convey liquid condensate to the chamber 22 in a manner which will be more specifically referred to hereinafter. A valve 27 is adapted to control the atmospheric connection 24, and, as shown, such valve is carried by diaphragm 21 and normally maintained in the position shown in Fig. 1 as by means of a spring 28 adjustable as to tension through a screw 29. With the valve 27 yieldably maintained in such a position as to close the atmospheric connection 24, it will be readily understood that, upon a predetermined rise in pressure of the fluid within chamber 22, sufficient to overcome the tension of spring 28, diaphragm 21 will be moved upwardly in order to permit communication to be established between the atmospheric connection 24 and chamber 22.

In operation, rotation of the vehicle engine will cause compressor 4 to deliver fluid under pressure to the reservoir 5 and this fluid pressure will be conducted to reservoir 6 through conduit 13 and from the latter to reservoir 7 by way of conduit 14. Continued operation of the compressor 4 will effect a further build-up of fluid pressure in reservoir 5, 6 and 7. So long as the compressor is operating at a substantially high speed, it will be possible to obtain a substantially equal increase of the pressure of the fluid in respressure in reservoirs 5, 6 and 7. So long as the the pressure in reservoir 5 might reach a sufficiently high value as to effect operation of the valve 18. This is because the rate of flow of fluid from the compressor to the reservoir is greater than the rate of exhaust of fluid pressure from reservoir 5 to the atmosphere through the open valve 18. Should the valve 18 open, it will be readily understood that any liquid condensate remaining in the bottom of reservoir 5 will be conducted to the atmosphere by way of conduit 26, chamber 22 and atmospheric connection 24. On the other hand, should the output of the compressor be decreased, which may be caused by a drop in speed of the compressor or by operation of the usual unloading device associated therewith, it will be apparent that the pressure of the fluid in reservoir 6 will be slightly higher than that in reservoir 5, it being assumed that the valve 18 is in open position due to the pressure within reservoir 5. Under these conditions, it will be readily apparent that reservoirs 5 and 6 will tend to equalize, and, during this operation, any liquid condensate in reservoir 6 will be conducted to reservoir 5 by way of conduit 13 and conduit section 15. When this operation occurs, it will be likewise understood that liquid condensate in reservoir 7 will be conducted to reservoir 6 by reason of the decrease in the fluid pressure within reservoir 6. Thus the liquid condensate in all reservoirs will be conducted in a direction opposite to the normal flow of fluid pressure, to reservoir 5, and therefrom conducted to atmosphere through valve 18. As soon as the pressure within reservoir 5 drops below the value for which valve 18 is set to open, this valve will close. In the event that the usual type of unloading device is associated with the compressor 4, it will be understood that the valve 18 is adjusted to open at a pressure slightly less than the pressure at which the unloader functions to unload the compressor. Actuation of the valve 12 would cause operation of the cylinders 8 and 9 in a manner well understood by those skilled in the art.

In operating devices of the foregoing character in cold weather, it is possible that sufficient liquid may be separated from the fluid pressure and may freeze in the bottom of the tanks. This might adversely affect the normal operation of the fluid pressure system since it may close the lower ends of conduit sections 15 and 16. In order to avoid any such difficulty, each of these conduit sections is provided with a check valve 30, the same being located in the conduit sections 15 and 16 adjacent the upper portions of the reservoirs. As shown, see Figs. 1 and 3, the check valve 30 includes a valve 31 resiliently urged as by means of a spring 32 against a seat 33 associated with the conduit section 16. The spring and valve are contained within a foraminated housing 34 which is threadedly received by the valve seat 33. It will be readily understood that, from this construction, fluid pressure in conduits 13 or 14 may be readily conducted to the respective reservoirs 6 and 7 past the check valves 31 irrespective of whether or not the lower ends of conduit sections 15 and 16 are obstructed by frozen condensate. It will be further understood that the check valve does not interfere in any manner whatsoever with the reverse siphoning action of the liquid condensate in reservoirs 6 and 7 during the period in the operation of the system when the pressure in reservoir 5 drops, as outlined hereinbefore.

Referring now to Fig. 2, the modification disclosed therein includes the reservoirs 5, 6 and 7 connected in series by conduits 13 and 14, as in Fig. 1. The arrangement, however, for exhausting accumulated liquid condensate is somewhat different from that shown in Fig. 1. As shown, a pressure-responsive valve device 35 is associated with reservoir 5 and includes a casing having upper and lower sections 36 and 37 together with a pressure-responsive diaphragm 38 interposed therebetween and dividing the casing into upper and lower chambers 39 and 40 respectively. Within the lower chamber is housed a valve-operating member 41 adapted to be actuated by the diaphragm 38 in a downward direction, as viewed in Fig. 2, to effect the opening of a valve 42 normally resiliently maintained in contact with a seat 43 as by means of a spring 44. With valve 42 closed, communication between a chamber 45, in open communication with the bottom of reservoir 5 through conduit 26, and atmospheric connection 46 is interrupted. However, upon downward movement of diaphragm 38 and valve-operating member 41, valve 42 is opened in order to establish communication between the interior of reservoir 5 and the atmospheric connection 46 by way of conduit 26, chamber 45 and open valve 42.

Means are provided for actuating the diaphragm 38, and, as shown, such means are responsive to a predetermined increase in pressure in reservoir 7. More particularly, a fluid pressure-operated governor device 47, which may be constructed as shown in the patent to Burton A. Aikman No. 1,754,218, granted April 15, 1930, is interconnected between reservoir 7 and chamber 39 as by means of conduits 48 and 49. The construction of governor 47 is such as to interconnect the reservoir and chamber when a predetermined rise in fluid pressure has occurred in reservoir 7, and, as soon as the said connection is effected, fluid pressure from reservoir 7 is conducted to chamber 39 in order to effect an opening in the valve 42 as heretofore described.

In operation of the system disclosed in Fig. 2, fluid pressure from compressor 4 will be conducted to the various reservoirs through conduits 17, 13 and 14 and is available for operation of the cylinders 8 and 9 through actuation of valve 12. As soon as the pressure in reservoir 7 reaches a value sufficient to operate the governor 47, the fluid pressure conducted to chamber 39 through conduits 48 and 49 will effect an opening of valve 42. So long as compressor 4 is operated at a substantially high speed, the pressure within reservoir 5 will be maintained slightly higher than the pressure in reservoir 6 irrespective of the open valve 42. However, in the event that the build-up of pressure in reservoir 5 is suddenly decreased, as by a slowing down of compressor 4, the pressure of the fluid within reservoir 6 will be slightly greater than that existing in reservoir 5 and the siphoning action of the liquid condensate in reservoir 6 to reservoir 5 will occur in a manner similar to that described in connection with Fig. 1. Likewise, liquid condensate in reservoir 7 will be conducted to reservoir 6 and from the latter to reservoir 5. It will be understood that, under these conditions, liquid condensate from the last named reservoir will be exhausted to the atmosphere past the open valve 42.

While, in connection with the system of Fig. 2, the pressure-responsive governor 47 has been illustrated and described as associated with the last reservoir in the series, it will be readily understood that the governor may be responsive to the pressure of either of the other reservoirs if desired. The operation of the system will be the same as heretofore outlined, with this change, except that the operation of the valve device 35 will be governed by the pressure existing in reservoirs 5 or 6 rather than in the reservoir 7.

There has thus been provided by the present invention a novel and efficiently operable fluid pressure system embodying relatively simple means for relieving the system of liquid condensate which, during severe cold weather, would freeze and adversely affect the various valves and other devices necessary for operating vehicle controlling fluid pressure-operated devices. The use of the plurality of reservoirs arranged in series insures a relatively complete condensation of the liquid entrained in the fluid pressure system and the connections between these reservoirs, and the use of the pressure-responsive valve devices disclosed secures an automatic and efficiently operable exhausting of the liquid condensate.

While two embodiments of the invention have been disclosed and described herein, it will be understood that various changes in the component parts of the structures and rearrangements of the same may be resorted to without departing from the spirit of the invention, as well understood by those skilled in the art. Reference will, therefore, be had to the appended claims for a definition of the limits of the invention.

What is claimed is:

1. The combination with a fluid receiving system, of a connection through which liquid condensate which may accumulate in said system is adapted to be exhausted, a compressor to supply fluid under pressure to said system, said system comprising a plurality of reservoirs arranged in series relation, conduits forming a part of said connection interconnecting said reservoirs for serially supplying fluid pressure thereto, said conduits having one end thereof connected to one reservoir and the other terminating within an adjacent reservoir near the bottom thereof for serially conducting condensate collected in certain of said reservoirs to the first reservoir of said series upon a reduction of pressure in the latter with respect to said certain reservoirs, pressure-responsive means normally closing said connection, a conduit forming a part of said connection and having one end thereof connected to said pressure-responsive means, and the other end terminating adjacent the bottom of said first reservoir, and check valve means positioned within certain of said reservoirs and associated with said first named conduits, said pressure-responsive means operable at a predetermined pressure in said first reservoir to exhaust accumulated condensate collected in said first reservoir through said connection.

2. The combination with a fluid receiving system, of a connection through which liquid condensate which may accumulate in said system is adapted to be exhausted, a compressor to supply fluid under pressure to said system, said system comprising a plurality of reservoirs arranged in series relation, conduits forming a part of said connection interconnecting said reservoirs for serially supplying fluid pressure thereto, said conduits having one end thereof connected to one reservoir and the other terminating within an adjacent reservoir near the bottom thereof for serially conducting condensate collected in certain of said reservoirs to the first reservoir of said series upon a reduction of pressure in the latter with respect to said certain reservoirs, pressure-responsive means normally closing said connection, and a conduit forming a part of said connections and having one end thereof connected to said means, and the other end terminating within said first reservoir, said means operable at a predetermined pressure in said first reservoir to exhaust accumulated condensate collected therein through the last named conduit.

3. In a fluid pressure system having a compressor and a plurality of fluid receiving reservoirs, a conduit connecting said compressor with one of said reservoirs, conduits connecting said one reservoir and the remaining reservoirs in series relation, said last named conduits terminating adjacent the bottoms of said remaining reservoirs for serially conducting condensate accumulated in said remaining reservoirs to said one reservoir upon a reduction of pressure in the latter with respect to said remaining reservoirs, and means for exhausting liquid condensate accumulated in said one reservoir, said means comprising a connection associated with said one reservoir and terminating adjacent the bottom thereof, valve means normally closing said connection and means responsive to the pressure within said one reservoir for opening said valve means.

4. In a fluid receiving system having a compressor, a plurality of fluid reservoirs, a conduit supplying fluid pressure to one reservoir, conduits connecting said reservoirs in series relation, said conduits terminating within the remaining reservoirs of said system adjacent the bottoms thereof for serially conducting condensate accumulated in said remaining reservoirs to said one reservoir upon a reduction in pressure in the latter with respect to said remaining reservoirs, a conduit forming an atmospheric connection with said one reservoir and terminating within said one reservoir adjacent the bottom thereof, valve means normally closing said connection, pressure-responsive means connected with one of said remaining reservoirs, said valve means including a pressure-responsive element operable by movement of said pressure-responsive means to open said valve means, a second valve means positioned within said remaining reservoirs and associated with said first named conduits to supply fluid pressure to said remaining reservoirs when the ends of said conduits adjacent the bottoms of the reservoirs are obstructed, said pressure-responsive means being operable at a predetermined pressure in said one of said remaining reservoirs to open said first valve means causing a reduction in pressure in said one reservoir when the rate of flow through said connection is greater than the rate of flow of the fluid supplied to said one reservoir whereby a reversal of flow of fluid pressure will occur forcing the accumulated condensate in the reservoirs of said system to said one reservoir and exhaust said condensate to atmosphere through said connection.

5. The combination with a fluid pressure system having first and second reservoirs for receiving fluid under pressure and condensing liquid vapor suspended in said fluid and a compressor for supplying fluid under pressure to said first reservoir, of means for conducting fluid under pressure from said first reservoir to the second reservoir and for serially discharging condensate from said second reservoir to said first reservoir upon a reduction of fluid pressure in the latter with respect to said second reservoir, the last-named means including a conduit having one end connected to said first reservoir and the other end terminating within the second reservoir near the bottom thereof, a second conduit associated with said first reservoir having one end terminating within said first reservoir near the bottom thereof, and valvular means associated with the other end of said conduit for discharging condensate from the first reservoir to atmosphere and including a member responsive to the pressure in the system for controlling the operation of said valvular means to connect said last named conduit with atmosphere when the pressure in the system exceeds a predetermined value.

6. The combination with a fluid receiving system of a connection through which liquid condensate which may accumulate in said system is adapted to be exhausted, a compressor to supply fluid under pressure to said system, said system comprising a plurality of reservoirs arranged so that substantially all of said condensate collects in one reservoir of said system upon a reduction of pressure in the latter with respect to the other reservoirs of said system, valve means normally closing said connection, a conduit included in said connection and having one end thereof communicating with said valve means and the other end communicating with said one reservoir, and a pressure responsive element operable at a predetermined pressure in another reservoir of said system to operate said valve means to exhaust accumulated condensate collected in said one reservoir through said connection.

7. In a fluid pressure receiving system having a plurality of reservoirs, means for connecting the reservoirs so that substantially all condensate which may accumulate in said system will collect in one reservoir of said system upon reduction of pressure in the latter with respect to the other reservoirs of said system, means associated with said one reservoir for connecting the same to atmosphere, pressure responsive means normally closing said second means, said pressure responsive means operable at a predetermined pressure in another reservoir of said system to exhaust accumulated condensate in said one reservoir through said second means.

8. In a fluid pressure receiving system having a plurality of reservoirs, means for connecting said reservoirs so that substantially all condensate which may accumulate in said system will collect in one reservoir of said system upon reduction of pressure in the latter with respect to the other reservoirs of said system, an atmospheric connection associated with said one reservoir for exhausting said condensate from said one reservoir, a valve for normally closing said connection, a pressure responsive diphragm operatively connected with said valve and adapted to move the latter to open position whereby said accumulated condensate may be exhausted, and a conduit connected with one of said other reservoirs for subjecting the diaphragm to fluid pressure in the last named reservoir.

9. The combination with a fluid pressure system having a plurality of reservoirs and means for supplying fluid under pressure to one of said reservoirs, of connections between said reservoirs for serially supplying fluid from the first reservoir to the other reservoirs and for conducting substantially all condensate serially from the other reservoirs to the first reservoir upon a reduction of pressure in the latter with respect to said other reservoir, and means associated with said first reservoir including valvular means responsive to variations in pressure in one of the reservoirs for exhausting said condensate from said first named reservoir to atmosphere.

10. The combination with a fluid pressure receiving system having first and second reservoirs and means for supplying fluid pressure to one of said reservoirs, of means for conducting fluid from the first to the second reservoir and for conducting substantially all condensate from the second reservoir to the first reservoir upon reduction of pressure in said first reservoir with respect to said second reservoir, and means associated with said first named reservoir and operable in response to variations of pressure in one of said reservoirs for discharging said condensate from said first named reservoir.

11. In combination with a fluid pressure receiving system having a plurality of reservoirs and means for supplying fluid pressure to one of said reservoirs, means for serially supplying fluid pressure from said one reservoir to the other reservoirs and for serially conducting substantially all condensate from said other reservoirs to said one reservoir upon a reduction of pressure in the latter with respect to said other reservoirs, and means responsive to a predetermined pressure in said one reservoir for discharging the condensate collected in said one reservoir to atmosphere.

12. In combination with a fluid pressure receiving system having a plurality of reservoirs, means for supplying fluid pressure to one of said reservoirs, means for serially supplying fluid pressure from said one reservoir to the other reservoirs and for serially conducting substantially all condensate from said other reservoirs to said one reservoir upon a reduction of pressure in the latter with respect to said other reservoirs, means including a member responsive to a predetermined pressure in said one reservoir for discharging the condensate accumulated in said one reservoir and for reducing the pressure in the latter with respect to said other reservoirs when the rate of flow through the last named means is greater than the rate of flow through the first named means.

13. In combination with a fluid pressure system having a plurality of reservoirs, means for supplying fluid pressure to one of said reservoirs, means for serially supplying fluid pressure from said one reservoir to the other reservoirs of said system and for serially conducting substantially all condensate accumulated in said other reservoirs to said one reservoir upon a reduction of pressure in said one reservoir with respect to said other reservoirs, and means including a member responsive to a predetermined pressure in one of said other reservoirs for discharging condensate collected in said one reservoir to atmosphere and for effecting a reduction of pressure in said one reservoir when the rate of flow through the last-named means is greater than the rate of flow through the first-named means.

14. In combination with a fluid pressure receiving system having a plurality of reservoirs, and means for supplying fluid pressure to one of said reservoirs, means for serially supplying fluid pressure from said one reservoir to the other reservoirs and for serially conducting substantially all condensate from said other reservoirs to said one reservoir upon a reduction of pressure in the latter with respect to said other reservoirs, and means responsive to a predetermined pressure in said system for discharging the condensate collected in said one reservoir to atmosphere.

15. In a fluid pressure system having first and second reservoirs, means for supplying fluid pressure to said first reservoir, means for supplying fluid pressure from said first reservoir to said second reservoir and for conducting substantially all condensate from said second reservoir to said first reservoir upon a reduction in pressure in the latter with respect to said second reservoir, a conduit forming an atmospheric connection with said first reservoir, means normally closing said connection, and means responsive to a predetermined pressure in one of said reservoirs for opening said connection to exhaust condensate accumulated in said first reservoir to atmosphere and to reduce the pressure of the fluid in said first reservoir when the rate of flow through said connection is greater than the rate of flow through the first-named means.

16. In a fluid receiving system comprising a fluid compressor, a plurality of fluid reservoirs and a conduit connecting the compressor to one reservoir of said system for supplying fluid pressure thereto, conduits connecting all of the reservoirs in series relation for serially supplying fluid pressure from said one reservoir to the remaining reservoirs of said system, said conduits including portions terminating adjacent the bottoms of successive reservoirs for serially conducting condensate accumulated in said remaining reservoirs to said one reservoir upon a reduction of pressure in the latter with respect to said remaining reservoirs, an atmospheric connection comprising a conduit terminating within said one reservoir near the bottom thereof, said connection including a pressure-responsive member having a valve associated therewith for normally closing said connection, said member being responsive to a predetermined pressure in one of said remaining reservoirs for operating said valve to open said connection to discharge the accumulated condensate from said one reservoir to atmosphere and for effecting a drop in pressure in said one reservoir when the rate of flow through said connection is greater than the rate of flow through the first-named conduit.

17. The combination with a fluid pressure system having first and second reservoirs for receiving fluid pressure and for condensing liquid vapor suspended in said fluid and a compressor for supplying fluid pressure to the first reservoir, of means for conducting fluid pressure from the first reservoir to the second reservoir and for conducting substantially all condensate accumulated in said second reservoir to said first reservoir upon a reduction of pressure in the latter with respect to said second reservoir, said means including a conduit having one end connected to the first reservoir and the other terminating within the second reservoir near the bottom thereof, a second conduit associated with the first reservoir having one end terminating within the reservoir near the bottom thereof, and valvular means associated with the other end of said second conduit for controlling the discharge of accumulated condensate in said first reservoir to atmosphere through said second conduit.

ROY S. SANFORD.
WILLIAM J. ANDRES.

CERTIFICATE OF CORRECTION.

Patent No. 2,268,086. December 30, 1941.

ROY S. SANFORD, ET AL.

It is hereby certified that error appears in the printed specification of the above numbered patent requiring correction as follows: Page 2, first column, line 37, strike out "pressure in reservoirs 5, 6 and 7. So long as the" and insert instead the syllable and words --ervoirs 5, 6 and 7 notwithstanding the fact that--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.